(12) United States Patent
Petillon

(10) Patent No.: US 9,199,744 B2
(45) Date of Patent: Dec. 1, 2015

(54) METHOD AND A DEVICE FOR ISSUING TERRAIN AVOIDANCE WARNINGS FOR A ROTARY WING AIRCRAFT

(71) Applicant: AIRBUS HELICOPTERS, Marignane, Cedex (FR)

(72) Inventor: Jean-Paul Petillon, Miramas (FR)

(73) Assignee: Airbus Helicopters, Marignane (FR)

( * ) Notice: Subject to any disclaimer, the term of this patent is extended or adjusted under 35 U.S.C. 154(b) by 0 days.

(21) Appl. No.: 14/326,717

(22) Filed: Jul. 9, 2014

(65) Prior Publication Data
US 2015/0266591 A1 Sep. 24, 2015

(30) Foreign Application Priority Data
Jul. 10, 2013 (FR) ...................... 13 01635

(51) Int. Cl.
*B64D 45/04* (2006.01)
*B64C 27/57* (2006.01)
*B64C 27/56* (2006.01)

(52) U.S. Cl.
CPC ................ *B64D 45/04* (2013.01); *B64C 27/56* (2013.01); *B64C 27/57* (2013.01)

(58) Field of Classification Search
CPC ...................................................... B64D 45/04
See application file for complete search history.

(56) References Cited

U.S. PATENT DOCUMENTS

| 6,088,654 A | 7/2000 | Lepere et al. |
| 6,380,870 B1 | 4/2002 | Conner et al. |
| 6,583,733 B2 | 6/2003 | Ishihara et al. |
| 6,683,556 B2 | 1/2004 | Block |
| 6,691,004 B2 * | 2/2004 | Johnson et al. ................. 701/14 |
| 6,833,797 B2 | 12/2004 | Ishihara |
| 6,906,641 B2 | 6/2005 | Ishihara |
| 7,363,121 B1 | 4/2008 | Chen et al. |
| 7,761,193 B2 | 7/2010 | Artini et al. |
| 8,190,308 B2 | 5/2012 | Pitard et al. |

(Continued)

FOREIGN PATENT DOCUMENTS

| FR | 2773609 | 7/1999 |
| FR | 2813963 | 3/2002 |

(Continued)

OTHER PUBLICATIONS

French Search Report for FR 1301635, Completed by the French Patent Office on Apr. 24, 2014, 7 pages.

(Continued)

*Primary Examiner* — James Trammell
*Assistant Examiner* — James E Stroud
(74) *Attorney, Agent, or Firm* — Brooks Kushman P.C.

(57) ABSTRACT

A method and a device (50) for issuing a terrain avoidance warning for a rotary wing aircraft (100) during which at least one bundle (N1, N2) of possible avoidance trajectories for said aircraft (100) is prepared in order to avoid a collision between said aircraft (100) and the relief (70) being overflown. A warning is then triggered as soon as said relief (70) being overflown is found to be at a distance from any one of said bundles (N1, N2) of possible avoidance trajectories that is less than a predetermined distance (Mv). Said avoidance trajectories are determined on the basis of a predetermined avoidance maneuver and on the basis of states of said aircraft (100), said predetermined avoidance maneuver being performed at a predetermined maximum power of said aircraft (100).

17 Claims, 2 Drawing Sheets

(56) References Cited

U.S. PATENT DOCUMENTS

| | | |
|---|---|---|
| 8,280,622 B2 | 10/2012 | Meunier et al. |
| 8,547,252 B2 | 10/2013 | Germanetti et al. |
| 2003/0107499 A1 | 6/2003 | Lepere et al. |
| 2005/0004723 A1* | 1/2005 | Duggan et al. .................. 701/24 |
| 2006/0184294 A1* | 8/2006 | Ma et al. ......................... 701/25 |
| 2007/0129855 A1* | 6/2007 | Coulmeau ......................... 701/3 |
| 2007/0276553 A1* | 11/2007 | Bitar et al. ....................... 701/3 |
| 2008/0215197 A1* | 9/2008 | Pitard et al. ...................... 701/9 |
| 2009/0043462 A1* | 2/2009 | Stratton et al. ................. 701/50 |
| 2009/0076728 A1* | 3/2009 | Bouchet et al. .............. 701/301 |
| 2010/0106419 A1 | 4/2010 | Flotte et al. |
| 2011/0125346 A1 | 5/2011 | Ben-Arie et al. |
| 2011/0196598 A1* | 8/2011 | Feyereisen et al. ........... 701/120 |
| 2011/0234425 A1 | 9/2011 | Germanetti et al. |

FOREIGN PATENT DOCUMENTS

| | | |
|---|---|---|
| FR | 2870604 | 11/2005 |
| FR | 2932919 | 12/2009 |
| WO | 2007012749 | 2/2007 |
| WO | 2007054448 | 5/2007 |

OTHER PUBLICATIONS

Anderson et al. IEEE Aerospace Conference Mar. 5, 2011, p. 1-7, XP 031938104, "Design and Implementation of TAWS for Rotary Wing Aircraft."

* cited by examiner

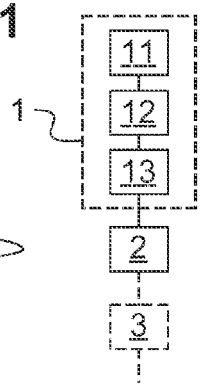
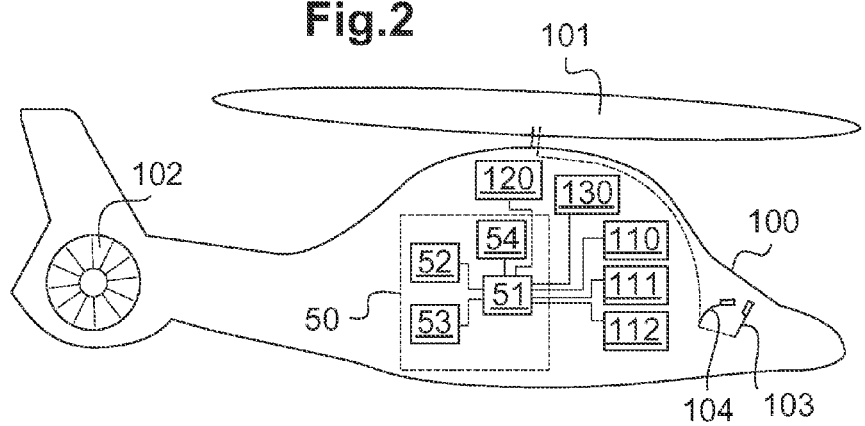
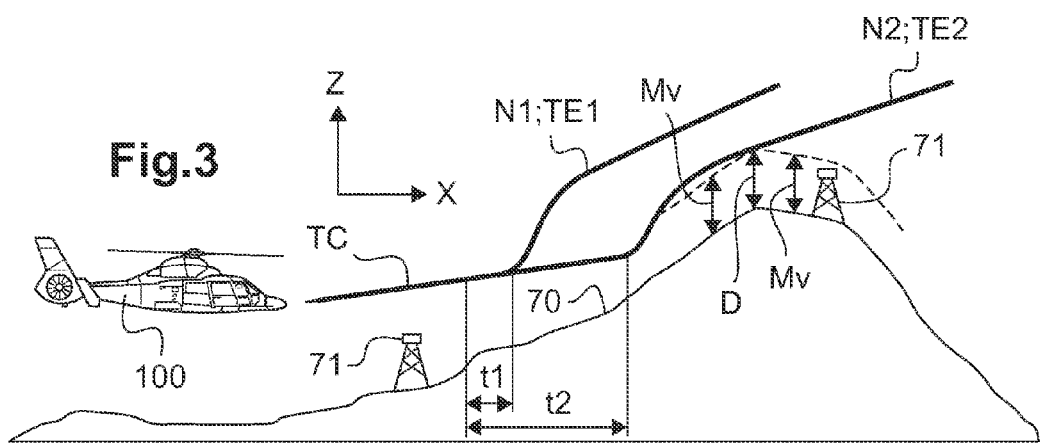
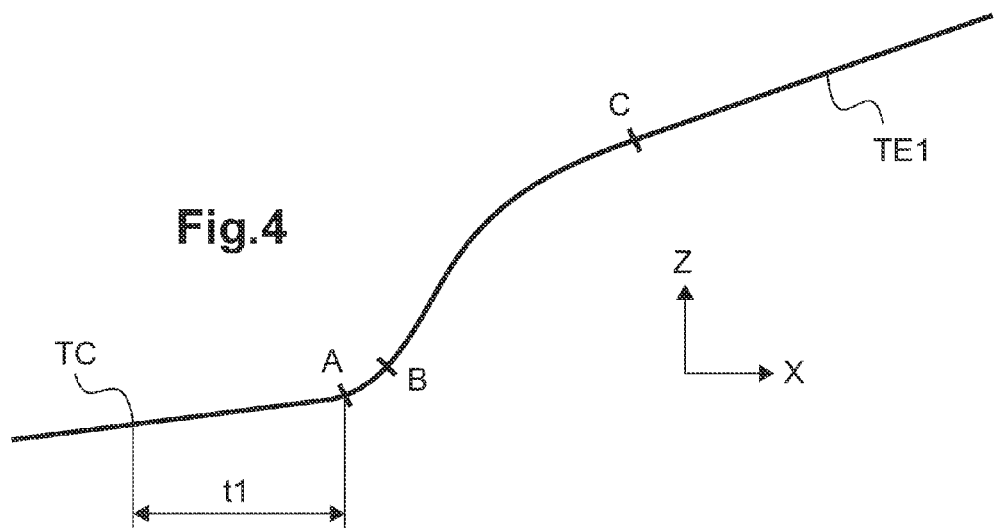

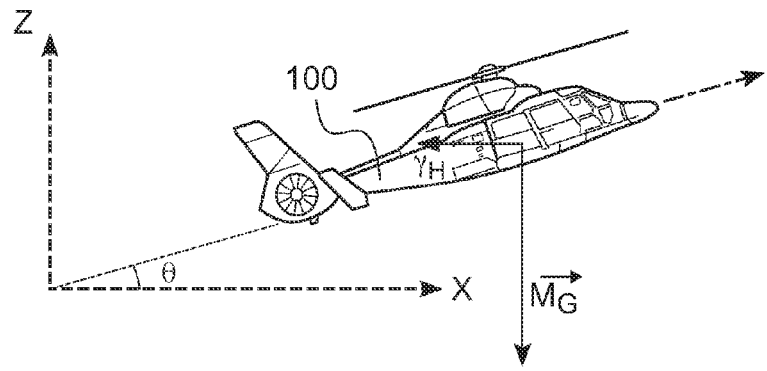
Fig.5
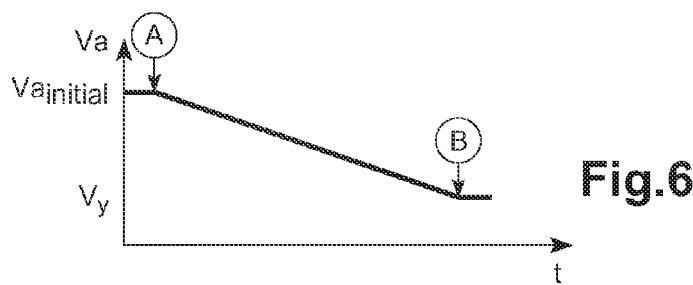
Fig.6
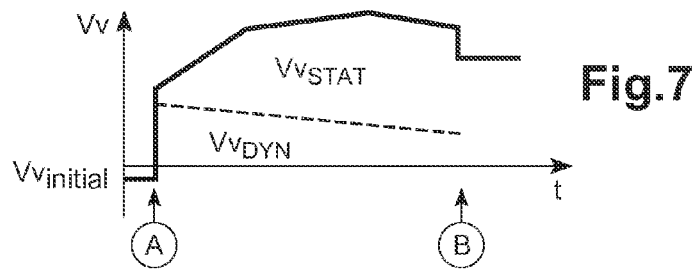
Fig.7
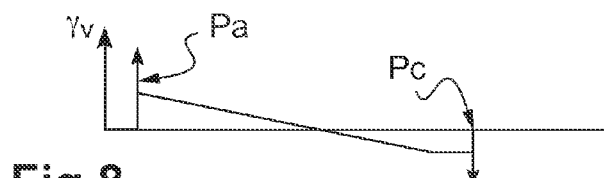
Fig.8
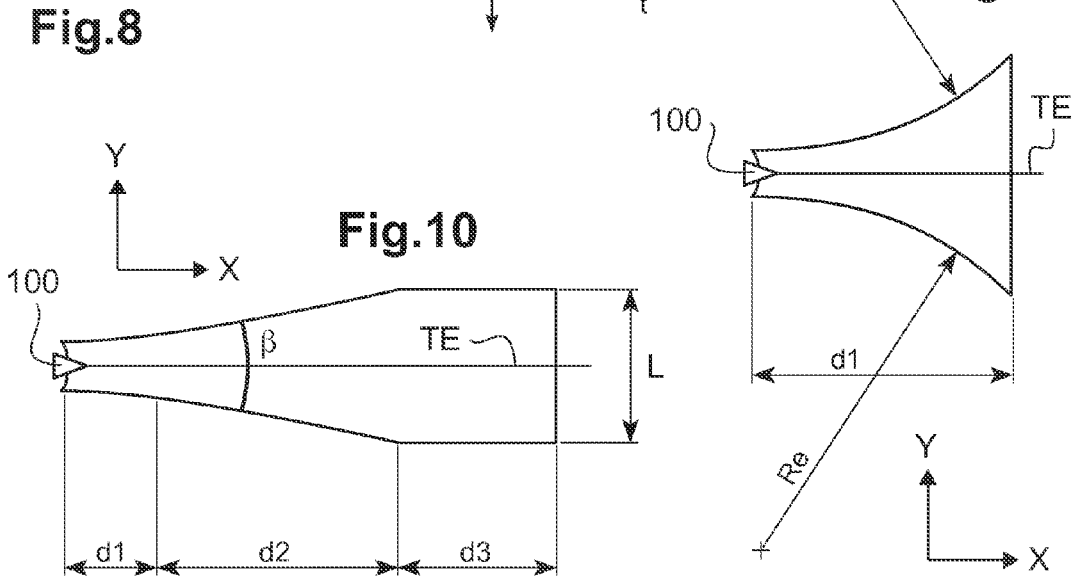
Fig.9
Fig.10

METHOD AND A DEVICE FOR ISSUING TERRAIN AVOIDANCE WARNINGS FOR A ROTARY WING AIRCRAFT

CROSS REFERENCE TO RELATED APPLICATION

This application claims priority to French patent application No. FR 13 01635 filed on Jul. 10, 2013, the disclosure of which is incorporated in its entirety by reference herein.

BACKGROUND OF THE INVENTION (1) Field of the Invention

The present invention relates to the general technical field of providing assistance in piloting rotary wing aircraft, and in particular to the fields of obstacle avoidance warnings. More particularly, the present invention relates to a method of issuing a warning to enable a rotary wing aircraft to avoid terrain, and it also relates to a device for performing the method and to an aircraft including such a device.

(2) Description of Related Art

Such piloting assistance systems for issuing a terrain avoidance warning are known as terrain avoidance warning systems (TAWS).

While dangerous obstacles and relief situated ahead of the trajectory of an aircraft are being approached, a TAWS serves to indicate their presence. TAWS systems include in particular a function for avoiding the relief being overflown that is known as forward-looking terrain avoidance (FLTA). Because of this FLTA function, such a TAWS systems makes it possible for example to prevent an aircraft crashing into the ground even though the pilot at the controls has not lost control, e.g. as a result of a navigation error or as a result of being wrongly informed about the height of relief being overflown or of obstacles, if any. Such an accident is sometimes referred to as controlled flight into terrain (CFIT).

Such a system thus makes it possible to produce warnings automatically as a function of databases concerning the relief and obstacles if any being overflown and also possibly as a function of an avoidance trajectory when the trajectory of the aircraft interferes with the relief or indeed with an obstacle.

Another system is known as a ground proximity warning system (GPWS) and serves to warn the pilot of an aircraft that the ground is close.

These systems have been designed mainly for airplanes and they are not well adapted or suitable for rotary wing aircraft. In comparison with a fixed wing aircraft, such as an airplane, a rotary wing aircraft is capable of performing a wide variety of different types of flight. It is only in cruising flight that they are genuinely comparable with the flight of airplanes. A rotary wing aircraft may in particular perform hovering flight, flights in a direction that is purely vertical or purely lateral, and it may also fly for long periods of time very close to the ground and to obstacles.

During such flights, the parameters taken into consideration and the warnings supplied by a terrain avoidance system designed for an airplane are not appropriate and are possibly even undesirable for rotary wing aircraft, since they might constitute a nuisance for the pilot.

In addition, since the controls for piloting a rotary wing aircraft are fundamentally different from those of an airplane, executing an avoidance maneuver requires specific piloting actions to be taken that are different from those in an airplane.

Given this observation, systems for assisting piloting by providing terrain avoidance warnings have been adapted for rotary wing aircraft and are known as helicopter terrain avoidance warning systems (HTAWS).

Document FR 2 773 609 describes a method of avoiding collision between an aircraft and relief being overflown, which method is capable of determining a bundle of possible trajectories for the aircraft together with two avoidance trajectories when performing known maneuvers. An outline can then be obtained and is represented by the intersection between the relief and firstly the possible trajectories of the aircraft or secondly one or two avoidance trajectories. In addition, the outline and the trajectories may be displayed on display means, with color marking representing the risks of the aircraft colliding with the relief.

Also known is Document U.S. Pat. No. 6,380,870 which makes it possible to determine a distance over which the environment and the relief being overflown by an aircraft is analyzed for use in a relief proximity warning system. The analysis distance is variable. The reaction time is the product of a reaction time for the crew multiplied by the speed of advance of the aircraft below a predetermined cruising speed for the aircraft, and is constant above that predetermined cruising speed in order to limit unwanted warnings, in particular at low forward speeds.

According to Document FR 2 813 963, a risk of collision between an aircraft and the relief being overflown is established as a function of static and dynamic parameters of the aircraft and on the basis of at least one database of the relief being overflown. Display means serve to display a representation of that relief, possibly together with warnings and information for avoiding such a collision. Furthermore, the stages of takeoff and landing are taken into account in order to inhibit potential inappropriate warnings.

Furthermore, Document U.S. Pat. No. 6,906,641 describes a relief proximity warning system that defines two flight envelopes for an aircraft in order to improve the generation of warnings. A first envelope is a function of the trajectory of the aircraft, of distance from the relief, of altitude, and of the relief, whereas a second envelope is a function of solely of the trajectory and the distance from the relief.

Furthermore, Document U.S. Pat. No. 6,583,733 describes a relief proximity warning system for a helicopter with two modes of operation. Each mode is selected by the pilot and serves to adapt the system to flying conditions, such as altitude. The detection of relief may thus be improved and the nuisance rate due to inappropriate warnings can be reduced.

According to Document U.S. Pat. No. 6,833,797, a method serves to display the proximity of relief on display means by using color codes as a function of the distance of the aircraft and its forward speed. The flying stage of the aircraft is also taken into account in order to avoid untimely triggering of inappropriate warnings concerning the proximity of relief, in particular while landing.

Furthermore, Document U.S. Pat. No. 6,683,556 describes a method enabling the position and the direction of an aircraft to be determined relative to the relief or an obstacle on the ground. That method serves in particular to determine the height of the aircraft relative to the obstacle or the relief and to use color codes for displaying this height on display means.

Document FR 2 870 604 describes a method of making the flight of an aircraft safe at low altitude. That method monitors the compatibility of the trajectory of the aircraft with the relief being overflown depending on the flying conditions of the aircraft and in compliance with its maneuverability, and in particular its lateral and vertical turning load factors. A trajectory for vertically avoiding the relief can be determined, and for example includes a resource at constant load factor and radius.

Also known is Document EP 1 907 911, which describes a method of detecting a risk of an aircraft colliding with the relief being overflown, during which a trajectory for avoiding the relief is determined. The avoidance trajectory is determined by taking account of energy transfer of the aircraft during the avoidance maneuver and also taking account of variation in the speed of the aircraft.

Document WO 2007/054448 describes a system for providing a warning of an aircraft exceeding a limit point. The limit point corresponds to the last point of the trajectory of the aircraft from which it is possible to succeed in performing a predefined standard maneuver for avoiding the relief, with the avoidance maneuver being a function of the mass, the inertia, and the configuration of the aircraft.

According to Document U.S. Pat. No. 7,363,121, a relief proximity warning system for an aircraft loads a memory with spatial data relating to the relief being overflown by the aircraft in a predetermined priority order for the purpose of providing warnings as quickly as possible to the pilot. The predetermined priority order is a function of the position and of the trajectory of the aircraft.

Document FR 2 932 919 describes a terrain avoidance system for a rotary wing aircraft in which avoidance of the relief is determined while taking account in particular of the instantaneous maneuverability of the aircraft, in particular its instantaneous vertical acceleration and mass. An avoidance trajectory is then determined and is constituted by a substantially rectangular proximal segment representative of a transfer time, together with at least one distal segment that is of conical profile.

Furthermore, Document US 2011/0125346 describes a method defining protection envelopes for an aircraft that are associated with respective different predetermined flight regimes of the aircraft on the basis of a plurality of parameters of the aircraft. Thereafter, a protection envelope is selected as a function of the current flight regime of the aircraft.

Finally, also known as the Document "Design and implementation of TAWS for rotary wing aircraft" by T. Anderson as presented on Mar. 5, 2011 to the "IEEE Aerospace Conference", and Document US 2010/106419, which Documents form part of the technological background.

The function of issuing a warning to enable an aircraft to avoid terrain is thus generally based on making a comparison in real time between a predicted flight trajectory for the aircraft or an envelope of predicted flight trajectories, and models that represent the relief and obstacles, if any. The predicted trajectory may be associated with one or more predetermined avoidance maneuvers for the purpose of determining a limit point that corresponds to the last point on the predicted trajectory at which such a predetermined avoidance maneuver will enable the aircraft to avoid collision with the relief or the obstacle with a specific safety margin. The limit point is generally referred to as a vertical reference point (VRP).

This function enables a flight trajectory for the aircraft to be followed that is as close as possible to the relief and to give warnings that are appropriate so as to enable the aircraft to perform an appropriate avoidance maneuver in good time in order to avoid a collision.

This function of issuing a warning to enable an aircraft to avoid terrain may operate throughout all the stages of flight of the aircraft, while taking account of the current parameters of the aircraft. Knowledge of the environment being overflown by the aircraft is obtained from databases concerning the relief and the obstacles, if any.

Nevertheless, it can be understood that the variety of possible trajectories that can be performed by a rotary wing aircraft close to the relief and the obstacles makes it difficult to implement such a function of issuing a warning to enable an aircraft of this type to avoid the terrain. The warning needs to be given appropriately in order to leave the pilot enough time to perform the avoidance maneuver. Nevertheless, a definition of the avoidance trajectory that is too approximate may give rise to warnings being issued that are untimely and inappropriate, thereby encouraging the pilot to deactivate the system instead of having confidence in it and making using of it.

Such a function of issuing a warning to enable a rotary wing aircraft to avoid terrain must therefore generate warnings not only at the appropriate moment, but while also remaining reliable and safe in terms of the ability to avoid that relief.

Defining an avoidance maneuver that is realistic, optimal, and suitable for the aircraft is therefore of great importance in ensuring that this function is performed reliably and effectively. Nevertheless, for each model of rotary wing aircraft, maneuverability varies in non-negligible manner as a result of a variety of situations.

In particular, the maneuverability of a rotary wing aircraft can vary as a function of numerous parameters, including:

its intrinsic characteristics, such as its installed engine power, its aerodynamic characteristics, or its configuration, for example;

its flying environment, such as the current density of air; and its current operating states and parameters such as its instantaneous mass, and its current available engine power, for example.

BRIEF SUMMARY OF THE INVENTION

One of the objects of the function of the invention for issuing a warning to enable an aircraft to avoid terrain is thus to define at least one possible avoidance trajectory for the aircraft that both minimizes false alerts and is also as realistic as possible in terms real avoidance maneuvers that can be performed by and are suitable for the aircraft, while taking account of its characteristics, its actual performance, and its current state. Specifically, these avoidance maneuvers must be adapted to the special circumstance of high forward speeds in cruising flight.

It is necessary to use an algorithm for predicting trajectories and to make use of databases concerning relief and obstacles if any in order to ensure firstly that adequate protection is ensured in the presence of relief that is very steep, including cliffs, and secondly that trajectories for enabling the aircraft to cross safely any such relief that might be sheer do not give rise to warnings being issued in untimely manner.

In one aspect, the invention provides a method of issuing a terrain avoidance warning for a rotary wing aircraft comprising the following steps:

preparing at least one bundle of possible avoidance trajectories for the aircraft, these avoidance trajectories being determined for the purpose of avoiding the relief being overflown or an obstacle, if any; and triggering a warning as soon as a bundle of these possible avoidance trajectories leads to a distance from the relief or from an obstacle if any that is less than a predetermined distance.

This predetermined distance corresponds to a margin taken into account between the bundles of avoidance trajectories and the relief or an obstacle if any in order to guarantee that the aircraft overflies the relief or the obstacle if any in safe manner.

Furthermore, this method of issuing a warning for avoiding terrain is performed repetitively and cyclically so as to take account of the aircraft advancing relative to the relief and obstacles, if any, and also to take account of changes in its trajectory.

The method is remarkable in that each bundle of possible avoidance trajectories is determined on the basis of a predetermined avoidance maneuver and on the basis of current states of the aircraft, and comprises:

a deceleration stage of deceleration down to a predetermined forward speed, this deceleration stage being obtained by causing the aircraft to take up a predetermined nose-up attitude and being performed at a predetermined maximum power of the aircraft; and a final stage of the aircraft climbing, during which the predetermined forward speed of the aircraft is kept equal to the predetermined forward speed and the power from the engines is kept equal to the predetermined maximum power.

Furthermore, this method may include an initial stage of bringing the aircraft back into straight line flight that is performed before the deceleration stage. This initial stage is needed in particular when the aircraft has a non-zero rate of turn at the time it is necessary to perform the avoidance trajectory.

A nominal avoidance trajectory for the aircraft is prepared in particular in continuity with the current trajectory of the aircraft and lies ahead of the current position of the aircraft. Thereafter, a continuum of avoidance trajectories extend horizontally on either side of the nominal avoidance trajectory in order to take account of lateral uncertainty concerning the trajectory of the aircraft. The term "continuum of avoidance trajectories" is used to mean a continuous set of avoidance trajectories that can be followed by the aircraft. This continuum of avoidance trajectories together with the nominal avoidance trajectory thus forms a bundle of avoidance trajectories. In the field of aviation, it is also possible to use the term "feeler" to designate such a bundle projected forwards from the aircraft.

The method of the invention can prepare a plurality of avoidance trajectory bundles, while modifying, for each bundle, one or more parameters of the aircraft, the reaction time of the pilot, or indeed the way in which the nominal avoidance trajectory is prepared.

For example, each bundle may correspond to a different reaction time of the pilot for performing the avoidance maneuver, the reaction time of the pilot being the time between the instant the alarm is triggered and the beginning of executing the avoidance maneuver.

Each avoidance trajectory of the aircraft is generally obtained using a trajectory prediction algorithm and is completely independent of any navigation system that may be included in the aircraft. This algorithm can estimate future states of the aircraft for an appropriate future length of time as a function of current states of the aircraft. These current and future states of the aircraft include at least the position, the altitude and the forward speed, both in modulus and in direction of the aircraft, and also its vertical speed. Characteristics external to the aircraft such as wind direction and speed may advantageously be taken into account when preparing an avoidance trajectory.

The appropriate future length of time during which the future states of the aircraft need to be estimated depends essentially on the relief being overflown by the aircraft, and more precisely on the height of the relief or of any obstacles to be avoided. This future length of time may therefore be variable.

The future length of time is preferably constant in order to ensure that the method of the invention has constant calculation time. This future length of time should then be sufficiently long to take account of the worst that can happen to the aircraft. Such a worst case can correspond to the worst altitude change that the aircraft might encounter and to the distance needed for crossing it. This distance required for crossing the relief that is to be avoided is thus also a constant value.

For example, in order to avoid relief having an altitude of 3000 meters (m), an aircraft flying at a forward speed of 40 meters per second (m/s) with a capacity for climbing at a vertical speed of 15 m/s requires a length of time of 200 seconds (s), i.e. more than 3 minutes. The future length of time during which the future states of the aircraft need to be estimated is then at least 200 s and the length of the bundle of avoidance trajectories of the order of 8000 m.

Furthermore, this method of issuing a warning for avoiding terrain is performed repetitively. Ideally, the frequency with which the method is executed is high in order to obtain an effect that is "smooth" and continuous when preparing bundles of avoidance trajectories.

Nevertheless, in order to limit the calculation time associated with the method, while also taking account of a relief crossing distance that is sufficient, the frequency at which the method is executed preferably lies in the range 5 hertz (Hz) to 50 Hz. This frequency may also be a frequency that is variable, in particular as a function of the crossing distance for the relief that is to be avoided. For example, the frequency is reduced when the crossing distance of the relief that is to be avoided increases.

Preferably, this frequency at which the method is executed is a frequency that is constant.

The future states of the aircraft are advantageously estimated for the seconds immediately following the current instants with the help of states through which the aircraft has passed over a period of time prior to the current instants. This applies for example when the current rate of turn of the aircraft is not zero, in order to perform the initial stage. The trajectory prediction algorithm can thus estimate a reaction time of the aircraft in order to determine the turn prior to flying in a straight line, i.e. in order to execute the initial stage. This period of time prior to the current instant may be constituted for example by the 5 s or 7 s preceding the current instant.

The avoidance trajectory is a climbing trajectory in order to move away from the relief and obstacles. It corresponds to the trajectory that enables the greatest increase of altitude to be achieved, given the initial state and the characteristics of the aircraft.

In order to guarantee safe flight over the relief, a margin is taken into account between the avoidance trajectory and the relief or the obstacle, if any. This margin depends in particular on uncertainties concerning the position of the aircraft and also altitudes as taken from the database concerning relief and obstacles. For example, this margin may be 100 feet (ft) to 200 ft, i.e. 30 m to 60 m (where 1 ft is equal to 0.3048 m).

In order to simplify the calculations performed by the method of the invention, this margin is advantageously taken along a direction that is purely vertical.

Each avoidance trajectory needs to be adapted to the aircraft so as to be compatible with its capacities and its maneuverability. Furthermore, each avoidance trajectory needs to require a vertical load factor and a longitudinal attitude that are greater than would be adopted by the pilot of the aircraft if the aircraft were not in a dangerous situation.

Each avoidance trajectory is based on the assumption of an avoidance maneuver made up of the following stages:

a preliminary stage during which the pilot has not yet reacted, and thus during which the trajectory is purely an extension of the current trajectory;

possibly an initial stage of bringing the aircraft back into straight line flight, this stage being necessary when the aircraft has a non-zero rate of turn at the beginning of the avoidance maneuver;

a deceleration stage down to a predetermined forward speed $Va_{final}$, the deceleration stage being performed by taking up a predetermined nose-up attitude for the aircraft together with a predetermined maximum power of the aircraft; and a final stage of the aircraft climbing at this predetermined forward speed $Va_{final}$ and performed using the predetermined maximum power of the aircraft.

As mentioned above, the initial stage of putting the aircraft back into straight line flight does not always need to be performed. It is not necessary when the aircraft is already flying in a straight line.

Such an avoidance maneuver may be defined by the manufacturer of the aircraft, and in particular its deceleration stage and its final climbing stage may be defined by the manufacturer. The avoidance maneuver is also described in the flight manual of the aircraft and pilots needing to pilot the aircraft can advantageously be trained in executing the avoidance maneuver.

Thereafter, the deceleration stage and the final stage are performed at a predetermined maximum power of the aircraft. Thus, the power available for these stages is limited in order to avoid damaging the engines of the aircraft. The pilot of the aircraft advantageously makes use of a first limit indicator (FLI) in order to monitor the power being developed by the engines of the aircraft during these deceleration and climbing stages.

This predetermined maximum power may for example be the maximum continuous power (MCP) or the maximum takeoff power (TOP) of the aircraft. The maximum continuous power (MCP) is the maximum power that the entire drive train of the aircraft can deliver continuously without damaging itself, whereas the maximum takeoff power (TOP) is the maximum power that the drive train of the aircraft can deliver for a limited period of time, e.g. 5 minutes, without damage. The term "drive train" is used to mean all of the elements constituting driving means and mechanical transmission means, comprising in particular the engines, the main gearbox, and the transmission shafts.

Preferably, this predetermined maximum power is the maximum continuous power (MCP) of the aircraft.

This predetermined maximum power may equally well be a parameter for preparing different bundles of possible avoidance trajectories.

For example, a first bundle of possible avoidance trajectories corresponds to the maximum continuous power (MCP) of the aircraft and a second bundle corresponds to the maximum takeoff power (TOP). Thus, as a function of the warning supplied by the method of the invention, the pilot knows whether it is the maximum continuous power (MCP) or the maximum takeoff power (TOP) that should be used.

Furthermore, the predetermined forward speed $Va_{final}$ may advantageously correspond to a particular known operating point of the aircraft having the name $V_Y$, where the power needed for making the aircraft move forwards is at a minimum. Consequently, the power available for enabling the aircraft to climb is at a maximum. Thus, selecting this forward speed $V_Y$ enables the fastest rate of climb of the aircraft to be achieved.

This optimum climb forward speed $V_Y$ is substantially constant for a given rotary wing aircraft and is of the order of 65 knots (kt) to 80 kt.

It is nevertheless possible to envisage that this predetermined forward speed $Va_{final}$ is calculated by the method of the invention as a function of the current conditions of the aircraft and of its environment.

Furthermore, the deceleration stage is performed with a predetermined nose-up attitude of the aircraft. Taking up this attitude thus serves to increase the climbing capacity of the aircraft. This deceleration stage is important, in particular in the event of cruising flight at high forward speed.

During the deceleration stage, the predetermined nose-up attitude of the aircraft may for example lie in the range 10 degrees (°) to 25° relative to a horizontal plane. This predetermined nose-up attitude makes it possible to have a deceleration stage with deceleration that is stronger than used in a conventional stage of flight, but without becoming worrisome for passengers of the aircraft. This nose-up attitude is preferably constant and may for example be 15°.

This predetermined nose-up attitude may also be determined by the manufacturer of the aircraft in which case it is specified in the flight manual of the aircraft.

The deceleration stage is performed in particular with the help of a cyclic stick of the rotary wing aircraft, the cyclic stick controlling the cyclic pitch of the blades of the main rotor of the aircraft. Action on the cyclic stick enables the aircraft to take a nose-up attitude, thereby slowing it down and transforming a portion of its kinetic energy into potential energy. This deceleration stage thus makes it possible initially to gain altitude "for free" without putting additional strain on the engines and to increase the vertical speed of the aircraft.

Furthermore, and advantageously, the predetermined avoidance maneuver is based on the pilot acting on a collective stick of the aircraft as from the deceleration stage in order to increase the collective pitch of the blades of the main rotor of the rotary wing aircraft, unlike conventional deceleration maneuvers in level flight in which the collective pitch needs to be reduced. As a result, by pulling on the collective stick while also making use of a first limit indicator (FLI) the pilot can monitor the power developed by the engines of the aircraft. Thus, the pilot can control the power developed by the engines of the aircraft so that it is set on a value that is substantially equal to the predetermined maximum power, thereby having a large amount of power available without running the risk of damaging the engines.

The pilot preferably acts simultaneously on the cyclic stick and on the collective stick so as to cause the aircraft both to take on a nose-up attitude and to increase the mechanical power developed by the drive train of the aircraft. The aircraft can thus reach the predetermined forward speed $Va_{final}$ while keeping the power of its engines at the predetermined maximum power, thereby maximizing the rate of climb of the aircraft.

Each forward speed Va of the aircraft is characterized in particular by a vertical speed capacity Vv that is determined by a formula:

$$Vv = Vv_S(V_a, M_a, P_S, T_S, E_S) + GS\frac{\gamma_H}{g}$$

where $Vv_S(V_a, M_a, P_S, T_S, E_S)$ corresponds to a static component $Vv_{STAT}$ of the vertical speed Vv, and $$GS\frac{\gamma_H}{g}$$

corresponds to a dynamic component $Vv_{DYN}$ of the id vertical speed Vv.

In a preferred embodiment of the invention, the static component $Vv_{STAT}$ may be calculated using a table that is used by the method, the entries in the table being obtained from charts in the flight manual of the aircraft. This static component $Vv_{STAT}$ is a function of atmospheric parameters, of operating parameters, and of states of the aircraft. These charts are approved by certification authorities. Advantageously, linear interpolation is performed between the points given in the table in order to obtain the static component $Vv_{STAT}$ of this vertical speed Vv. Thus, the algorithm for determining the static component $Vv_{STAT}$ relies on certified data in the flight manual. As a result, no additional testing is needed to validate the algorithm, so the algorithm itself can easily be certified.

In another implementation of the invention, it is possible to express the charts in the flight manual in the form of one or more equations in order to determine the static component $Vv_{STAT}$ as a function of atmospheric parameters and of operating parameters of the aircraft, and also as a function of its states. The static component $Vv_{STAT}$ may also be determined using an aircraft simulator having as input data the atmospheric parameters and the operating parameters of the aircraft, and also the states of the aircraft.

The atmospheric parameters characterize the air surrounding the aircraft and comprise for example the static pressure Ps and the static temperature Ts around the aircraft.

The states of the aircraft comprise for example the instantaneous mass M of the aircraft, its forward speed Va relative to air, its forward speed GS relative to the ground, and its horizontal acceleration $\gamma_H$. The term "instantaneous mass" M of the aircraft is used to mean its mass at the current instant, i.e. taking account in particular of the loads being transported by the aircraft and also of the fuel it has consumed since the beginning of its flight. Furthermore, and preferably, the instantaneous mass is corrected in order to obtain the apparent mass $M_a$ of the aircraft as given by:

$$M_a = M \frac{\sqrt{g^2 + \gamma_H^2}}{g}$$

where g is the acceleration due to terrestrial gravity.

The operating parameters of the aircraft may be the configuration of the aircraft, the state of aging and/or the state of operation of its engines, and the retracted or else extended state of its landing gear. These operating parameters of the aircraft may be provided in particular by existing conventional flight equipment, e.g. by a first limit indicator computer or by a full authority digital engine control (FADEC) computer for controlling an engine.

An operating parameter of the aircraft may more particularly be a Boolean parameter $E_S$ characterizing the mode of operation of its engines, i.e. whether only one engine is operative or whether both engines are in operation. These modes of operation of the engines are specified by the acronyms OEI and AEO respectively for one engine inoperative and for all engines operative. This Boolean parameter $E_S$ has a very great influence on the shape of the avoidance trajectory.

Furthermore, aging of the engines may be taken into account when drawing up the table for determining the value of the static component $Vv_{STAT}$. During certification of an aircraft, charts specifying the performance of the engines are certified for engines that have aged or that have been identified during an engine health check. It is thus possible either to make direct use of the performance charts for aged engines, or else to use performance charts for new engines and to include an engine operating parameters that characterize their state of aging.

These current stages and these operating parameters of the aircraft thus make it possible to take account of the actual current characteristics and performance of the aircraft, and in particular those that have an impact on its maneuverability.

The dynamic component $Vv_{DYN}$ is based on the horizontal component of the forward speed GS of the aircraft relative to the ground and on the angle of inclination of the apparent horizontal of the aircraft. This angle θ of inclination of the apparent horizontal of the aircraft is determined by the equation:

$$\tan(\theta) = \frac{\gamma_H}{g}$$

where $\tan(\theta)$ is the trigonometric tangent function of the angle θ, $\gamma_H$ is the horizontal acceleration of the aircraft, and g is the acceleration of terrestrial gravity.

This vertical speed Vv thus takes account of the kinetic energy of the aircraft and of its horizontal deceleration.

Furthermore, this vertical speed Vv of the aircraft can vary all along the avoidance trajectory, and this variation may begin during the deceleration stage.

The avoidance maneuver does not include a resource stage at constant load factor and constant forward speed since the resource stage takes place during the deceleration stage.

Each bundle of avoidance trajectories takes account of lateral uncertainty concerning the trajectory of the aircraft and extends horizontally on either side of the nominal avoidance trajectory that is prepared. This bundle makes it possible in particular to take account of a possible change in the trajectory of the aircraft.

For a first time interval following the current instant, each bundle takes account of the possibility of a turn being started if the aircraft is flying in a straight line or of a possible variation in the rate of turn if the aircraft is already turning. The possible avoidance trajectories of each bundle then constitutes an envelope in the form of a fan, with the side limits of the envelope having radii of curvature $R_e$. These radii $R_e$ of curvature are mainly a function of the horizontal component of the current forward speed of the aircraft, of the rate of turn, and of the roll angle of the aircraft, and also of uncertainty concerning the roll angle.

The radii of curvature $R_e$ of this envelope may for example be given by:

$$R_e = \frac{V_H^2}{g \cdot \tan(\varphi)}$$

where g is the acceleration due to terrestrial gravity, φ is the initial roll angle of the aircraft plus or minus the uncertainty concerning this roll angle, and $V_H$ is the horizontal component of its forward speed.

A typical value for the uncertainty concerning the roll angle φ is 5°, for example.

After this first time interval, each envelope is in the form of a triangle for a second time interval, followed by a rectangle during a third time interval.

Each first time interval corresponds for example to traveling a distance of 100 m. The triangle constituted by the envelope during the second time interval may for example be an isosceles triangle having an angle at the apex of 30°, and the envelope has a lane width of 1 nautical mile over the third time interval.

Finally, when at least one bundle of avoidance trajectories has been prepared, one or more warnings may be issued in order to inform the pilot that the current trajectory of the aircraft is leading to a risk of collision with the relief being overflown or with an obstacle, if any. These warnings are issued when a bundle of avoidance trajectories leads to a distance from the relief being overflown or from an obstacle, if any, that is less than the margin.

By way of example, warnings may be issued as a function of assumptions concerning the reaction time of the pilot before beginning the avoidance maneuver. Under such circumstances, the method of the invention prepares different bundles of possible avoidance trajectories corresponding to predetermined pilot reaction times.

By way of example, a first warning may be issued when a first bundle of avoidance trajectories, as calculated on the assumption of the pilot reaction time being equal to 20 s, leads to a distance from the terrain or the obstacle that is less than the margin. This first warning serves to draw the pilot's attention to a risk of collision. The pilot can then take the situation of the aircraft into consideration and has sufficient time for correcting its trajectory in order to avoid the obstacle without necessarily undertaking an avoidance maneuver proper. This first warning may for example be in the form of a voice announcement saying "high terrain ahead".

A second warning may be issued for example when a second bundle of avoidance trajectories, as calculated on the assumption of the pilot's reaction time being equal to 5 s, leads to a distance from the terrain and the obstacles that is less than the margin. This second warning informs the pilot of an imminent risk of collision. The pilot must then react quickly in order to engage the predetermined maneuver for avoiding the relief or the obstacle if any, which maneuver is now necessary. Under such circumstances, the pilot is expected to cause the aircraft to perform an avoidance maneuver that is at least as aggressive as the nominal avoidance trajectory prepared by the method of the invention. By way of example, this second warning may be in the form of a voice announcement "pull up! pull up!" meaning that the pilot must immediately execute the predetermined maneuver for which the pilot has been trained in order to avoid the high relief located ahead on the current trajectory of the aircraft.

These warnings may be visual, e.g. in the form of a message or a symbol being displayed on a screen of the aircraft, and/or they may be audible, e.g. in the form of one or more sounds, or indeed in the form of a voice announcement that the pilot can hear. Under all circumstances, the warning must be sufficiently explicit to enable the pilot to identify the situation and perform the appropriate maneuver.

Furthermore, in a variant of the invention, the method of issuing a warning to enable an aircraft to avoid terrain may be coupled to an autopilot of the aircraft. The method of emitting a warning for enabling the aircraft to avoid terrain may thus include an additional step during which the avoidance maneuver is performed by the autopilot.

A control member used in this variant may for example be present on a control panel of the aircraft. When the warning is issued, and if the pilot operates this member, then the autopilot performs the avoidance maneuver.

In another implementation of the invention, the autopilot may perform the avoidance trajectory automatically. Under such circumstances, the method of the invention prepares a bundle of avoidance trajectories based on a pilot reaction time of zero.

Advantageously, the conditions for triggering warnings in order to avoid the aircraft colliding with the relief it is overflying are thus defined while taking account in real time of the position of the aircraft relative to the relief and to obstacles if any, of its current states, and of its configuration, in particular. As a result, the method of issuing a warning to avoid terrain is executed repetitively and cyclically in order to take account of the aircraft moving forwards relative to the relief and any obstacles, and also to take account of any changes in its trajectory.

The method of the invention thus adapts as a function of the actual current states and performance of the aircraft and of its maneuverability by taking account of its kinetic energy, thereby optimizing the avoidance trajectory and consequently its ability to generate only warnings that are pertinent.

In another aspect, the invention provides a device for issuing a terrain warning to the crew of an aircraft. Such a device comprises:

at least one computer suitable for performing a trajectory prediction algorithm;

at least a first database of the relief of flying zones of the aircraft connected to the computer; and at least one warning means connected to the computer.

This device is suitable for performing the above-specified method.

This first database may also contain information concerning obstacles, if any, in the flight zones of the aircraft. Nevertheless, the terrain warning issuing device may include at least a second database that is specific to such obstacles in the flight zones of the aircraft, the second database being connected to the computer.

In another aspect, the invention also provides a rotary wing aircraft comprising:

at least one main rotor having a plurality of blades;

a plurality of sensors providing information about atmospheric and operating parameters of the aircraft and also concerning its current states; and a device as specified above for issuing a terrain warning.

BRIEF DESCRIPTION OF THE SEVERAL VIEWS OF THE DRAWINGS

The invention and its advantages appear in greater detail from the context of the following description of implementations given by way of illustration and with reference to the accompanying figures, in which:

FIG. 1 is a synoptic diagram of a method of the invention for issuing a terrain warning;

FIG. 2 shows a rotary wing aircraft with a device of the invention for issuing a terrain warning;

FIG. 3 shows a rotary wing aircraft overflying high ground;

FIG. 4 is a detail view of a bundle of avoidance trajectories;

FIG. 5 is a view of a rotary wing aircraft;

FIGS. 6 to 8 are three graphs showing respectively the variations in forward speed, in vertical speed, and in acceleration of the aircraft during a stage of deceleration; and FIGS. 9 and 10 are two views of an envelope forming a bundle of avoidance trajectories for the rotary wing aircraft.

DETAILED DESCRIPTION OF THE INVENTION

Elements present in more than one of the figures are given the same references in each of them.

The figures show three directions X, Y, and Z that are mutually orthogonal and that form an orthogonal reference frame X, Y, Z.

A direction X is said to be "longitudinal", and corresponds to lengths or main dimensions of the structures described. Thus, the longitudinal direction X defines the main forward axis of the aircraft described and the tangents to their instantaneous trajectories at their centers of gravity.

Another direction Y is said to be "transverse", and corresponds to lateral trajectories or coordinates of the structures described. For simplification purposes, these longitudinal and transverse directions X and Y are sometimes said to be "horizontal", forming a horizontal XY plane.

A third direction Z is said to be "in elevation" and corresponds to height and altitude dimensions of the structures described. For simplification purposes, this direction Z is sometimes said to be vertical, with terms such as up/down, top/bottom, high/low, being relative thereto.

FIG. 1 shows a method in accordance with the invention for issuing a terrain avoidance warning that is for use in a rotary wing aircraft 100, this method comprising a plurality of steps.

FIG. 2 shows such a rotary wing aircraft 100. The aircraft 100 comprises in particular a main rotor 101 with a plurality of blades and serving to provide the aircraft 100 with lift and propulsion. The aircraft 100 optionally also has a tail rotor 102. The aircraft 100 also has a cyclic stick 103 and a collective stick 104 serving respectively to control the cyclic pitch and the collective pitch of the blades of the main rotor 101, and it also has a plurality of sensors 110, 111, 112 and a device for issuing a terrain avoidance warning that is suitable for performing the method described in FIG. 1.

The device 50 includes at least one computer 51, at least a first database 52 of the relief 70 of flying zones of the aircraft 100, at least a second database 53 of obstacles 71 in the flying zones of the aircraft 100, and warning means 54. The databases 52 and 53 and the warning means 54 are connected to the computer 51.

FIG. 3 shows this aircraft 100 overflying relief 70, which relief 70 may also include obstacles 71. The characteristics of this relief 70 are extracted by the computer 51 from the first database 52, while the characteristics of the obstacles 71 are extracted by the computer 51 from the second database 53. Nevertheless, these two database 52 and 53 may be combined so as to form a single database.

Such a method of issuing a terrain avoidance warning serves to generate warnings in good time when a risk is detected of collision between the aircraft 100 and the relief 70 being overflown, or indeed an obstacle 71 if any, for the purpose of performing a maneuver to avoid the relief 70 or indeed the obstacle 71.

Such an avoidance maneuver may be defined by the manufacturer of the aircraft and described in the flight manual of the aircraft.

Initially, during a first step 1 of the method, a plurality of possible avoidance path bundles N for the aircraft 100 are generated. Each bundle N comprises a nominal avoidance trajectory TE and a continuum of avoidance trajectories, each bundle N being situated ahead of the current position of the aircraft 100. Each nominal avoidance trajectory TE is prepared in continuity with the current trajectory TC of the aircraft 100, the continuum of avoidance trajectories extending horizontally on either side of the nominal avoidance trajectory TE. This bundle N thus serves to take account of lateral uncertainty concerning the trajectory of the aircraft 100 after the nominal avoidance trajectory TE has been prepared.

For example, two first nominal avoidance trajectories TE1 and TE2 are visible in FIG. 3 extending the current trajectory TC of the aircraft 100.

The bundles N1 and N2 then extend perpendicularly to FIG. 3 and therefore overlap in this right-side view with the first nominal avoidance trajectories TE1 and TE2 respectively. A plan view of the bundle N1 is also shown in FIGS. 9 and 10.

Each nominal avoidance trajectory TE extends the current trajectory of the aircraft 100 and is generally obtained by means of a trajectory prediction algorithm. This algorithm is executed by the computer 51 and serves to estimate the future states of the aircraft 100 as a function in particular of current states of the aircraft 100. These current and future states of the aircraft 100 include amongst other things: the position, the altitude, and the forward speed together with the vertical speed of the aircraft 100.

Each bundle N1, N2 comprises possible avoidance trajectories for the aircraft 100, one or more parameters of the aircraft 100, or indeed the preparation of the avoidance trajectory being modified in order to prepare each bundle N1, N2. For example, the bundle N1 corresponds to a first reaction time t1 of the pilot and the bundle N2 corresponds to a second reaction time t2 of the pilot, the first reaction time t1 being shorter than the second reaction time t2. Each reaction time t1, t2 corresponds to the time between the instant the warning is triggered and the instant the pilot reacts, and thus corresponds to the beginning of the avoidance trajectory forming each of the bundles N1, N2.

In FIG. 3, it can be seen that the bundle N2 is at a distance D from the relief 70 being overflown. This distance D is less than a predetermined distance corresponding to a vertical margin Mv, which means that there exists a risk of collision between the aircraft 100 and the relief 70.

With the bundle N2 corresponding to an assumed maximum reaction time t2, if the pilot of the aircraft 100 does not engage an avoidance maneuver within a time that is shorter than or equal to this reaction time t2, then the aircraft 100 runs the risk of entering into collision with the relief 71.

During a second step 2, a warning is then issued as soon as it is confirmed that there is indeed such a risk of collision between the aircraft 100 and the relief 70 or indeed an obstacle 71 if any, i.e. as soon as the distance D between at least one bundle N1 or N2 and the relief 70 or indeed an obstacle 71 if any is less than the predetermined distance Mv.

Each bundle N1, N2 comprises a nominal avoidance trajectory TE prepared by the computer 51 during the first step 1 on the basis of a predetermined avoidance maneuver and on the basis of the states of the aircraft 100. This nominal avoidance trajectory TE comprises at least three stages:

a preliminary stage 10 during which the pilot has not yet reacted, and thus during which the trajectory is a pure extension of the current trajectory TC;

a deceleration stage 12 down to a predetermined forward speed $Va_{final}$, the deceleration stage 12 being performed by causing the aircraft 100 to take up a predetermined nose-up attitude and doing so with a predetermined maximum power of the aircraft 100; and a final stage 13 of the aircraft 100 climbing at this predetermined forward speed $Va_{final}$ at the predetermined maximum power of the aircraft 100.

In addition, this method may include an initial stage 11 of putting the aircraft 100 back into straight line flight before performing the deceleration stage 12. This initial stage 11 is included in particular when the aircraft 100 has a non-zero rate of turn.

Preferably, this predetermined maximum power is the maximum continuous power (MCP) of the aircraft 100, which is the maximum power that the engines of the aircraft 100 can deliver continuously without damaging the drive train of the aircraft 100. Furthermore, and advantageously, the predetermined forward speed $Va_{final}$ is the optimum forward speed Vy for climbing.

This nominal avoidance trajectory TE needs to be matched to each rotary wing aircraft 100 and thus depends on its intrinsic characteristics and capacities such as its installed engine power and its aerodynamic characteristics, for example.

This nominal avoidance trajectory TE also depends on parameters concerning the atmosphere surrounding the aircraft 100.

Finally, this nominal avoidance trajectory TE depends on the current state of the aircraft 100 and on the operating parameters of the aircraft 100.

After optionally performing the initial stage 11 of putting the aircraft 100 back into straight line flight, the deceleration stage 12 enables the forward speed of the aircraft 100 to be reduced to the predetermined forward speed $Va_{final}$, which is reached at point C, as shown in FIG. 4. Thus, during this deceleration stage 12, the pilot begins with the help of the cyclic stick 103 of the aircraft 100 to increase the nose-up attitude of the aircraft 100 to a predetermined angle relative to a horizontal plane so that the aircraft 100 has a large amount of capacity for deceleration. This increase in the nose-up angle of the aircraft 100 takes place quickly and the attitude of the aircraft 100 is equal to the predetermined angle at point B. This increase in nose-up angle of the aircraft 100 requires a few seconds, e.g. 2 seconds (s) to 4 s. This predetermined angle is preferably constant and equal to 15°.

Thereafter, between the points B and C, the reduction in the kinetic energy of the aircraft 100 enables its potential energy to be increased, and consequently enables its vertical speed to be increased. The deceleration stage terminates at C where the forward speed reaches the predetermined speed $Va_{final}$. This predetermined forward speed $Va_{final}$ may be characterized by an optimum climb rate.

Furthermore, throughout the deceleration stage 12 and simultaneously with taking action on the cyclic stick 103, the pilot must pull on the collective stick 104 of the aircraft 100 in order to increase the collective pitch of the blades of the main rotor 101 of the rotary wing aircraft so that the engines of the aircraft 100 deliver the predetermined maximum power, with the pilot making use of a first limit indicator (FLI) of the aircraft 100 in order to monitor this predetermined maximum power. Thus, the pilot may have a large amount of power available without risking damage to the engines.

Finally, beyond point C, i.e. during the final climb stage 13, the avoidance trajectory is in a straight line, with the attitude of the aircraft 100 being maintained substantially horizontal, and with the forward speed of the aircraft 100 being the predetermined forward speed $Va_{final}$.

The variation in the forward speed of the aircraft 100, also referred to as its "air speed" or Va, during the deceleration stage 12 is shown in the graph of FIG. 6. In this graph, it can be seen that the nominal avoidance trajectory TE does not have an initial stage 11. As a result, the forward speed Va decreases as from the instant A, the aircraft 100 taking up a predetermined nose-up attitude and slowing down to the predetermined forward speed $Va_{final}$, which is reached at instant C.

Once instant C has been reached, the aircraft 100 enters into the final stage 13 of climbing, while its forward speed is maintained at the predetermined speed $Va_{final}$. The avoidance trajectory then becomes substantially a straight line.

As a result, the avoidance trajectory includes a resource stage solely between the instants A and C, i.e. during the deceleration stage 12 with a load factor and a forward speed that are not constant.

The graph of FIG. 7 shows a profile of variation over time in the vertical speed Vv of an aircraft 100 between the instants A and C, i.e. during this deceleration stage 12. This vertical speed Vv is constituted by a static component $Vv_{STAT}$ such that $Vv_{STAT} = Vv_S(M_a, V_a, P_S, T_S, E_S)$ and a dynamic component $Vv_{DYN}$ such that $$Vv_{DYN} = GS \frac{\gamma_H}{g},$$

with the various parameters of these components being defined below.

This static component $Vv_{STAT}$ may be taken from a table obtained from charts in the flight manual of the aircraft 100 and approved by certification authorities. A linear interpolation between points in the table may be performed in order to obtain the static component $Vv_{STAT}$ that is then a function of atmospheric parameters and of operating parameters of the aircraft 100, and also a function of the states of the aircraft 100.

By way of example, these various parameters may be obtained by means of the sensors 110, 111, 112 present in the aircraft 100.

By way of example, the atmospheric parameters are the static pressure Ps and the static temperature Is around the aircraft 100.

By way of example, the states of the aircraft 100 may be the instantaneous mass M of the aircraft 100, its forward speed Va relative to the air, its forward speed GS relative to the ground, and its horizontal acceleration $\gamma_H$. It is also possible to use the apparent mass Ma of the aircraft where:

$$M_a = M \frac{\sqrt{g^2 + \gamma_H^2}}{g}$$

where g is the acceleration due to terrestrial gravity.

By way of example, the operating parameters are the state(s) of the engine(s) of the aircraft 100, e.g. whether only one engine is operating or two engines are operating, the aging state of the engines, the configuration of the aircraft 100, or indeed whether the landing gear is retracted or extended.

By way of example, these operating parameters are supplied by existing conventional flight equipment such as a FADEC engine computer 130. This FADEC engine computer 130 is then connected to the computer 51 and it supplies a Boolean parameter $E_S$ characterizing the operating mode of the engines, i.e. the OEI and AEO modes.

The dynamic component $Vv_{DYN}$ is based on the horizontal component of the forward speed GS of the aircraft 100 relative to the ground and on the angle of inclination θ of the apparent horizontal of the aircraft 100. This angle of inclination θ of the apparent horizontal of the aircraft 100 is shown in FIG. 5 and is characterized by the arc-tangent function of the ratio of the horizontal acceleration $\gamma_H$ of the aircraft 100 to the acceleration g due to terrestrial gravity, such that:

$$\tan(\theta) = \frac{\gamma_H}{g}$$

Thus, this vertical speed Vv of the aircraft 100 is determined by a formula:

$$Vv = Vv_S(M_a, V_a, P_S, T_S, E_S) + GS\frac{\gamma_H}{g}$$

and takes account of the kinetic energy retrieved by horizontally decelerating the aircraft 100.

Furthermore, this vertical speed Vv of the aircraft may vary all along the avoidance trajectory under the effect of variations in its static and dynamic components:

the dynamic component $Vv_{DYN}$ increases with a step at instant A under the almost instantaneous effect of the aircraft 100 changing its attitude, and it then decreases in substantially linear manner over time as the forward speed GS of the aircraft relative to the ground decreases; and the static component $Vv_{STAT}$ increases monotonically from a small value corresponding to the initial maximum vertical speed of the aircraft, which maximum vertical speed may be zero if the aircraft was initially in level flight at its maximum forward speed.

Furthermore, and by way of example, the profile of the vertical acceleration γv of the aircraft 100 may be as shown in the graph of FIG. 8. In an implementation of the invention, this profile has two peaks $P_A$ and $P_C$ at the points A and C, which peaks are also known as Dirac pulses. In other implementations, the peaks $P_A$ and $P_C$ may be replaced by short rectangles of equal weight. The horizontal acceleration $\gamma_H$ of the aircraft 100 (not shown in the figures) can be deduced from the curve for variation in time of the speed Va. It may have a negative fixed value between instants A and C, corresponding to the deceleration of the aircraft 100, e.g. such that $$\gamma_H = -\tan(15°)g.$$

The position of the aircraft 100 and its forward speed may then be calculated from its acceleration by integration taking account of initial conditions, i.e. the conditions at point A, and also taking account of wind.

Nevertheless, the trajectory of the aircraft 100 may be modified by the pilot in unforeseeable manner. In order to determine whether there exists a risk of collision between the aircraft 100 and the relief 70 being overflown, while also taking account of lateral uncertainty concerning the trajectory followed by the aircraft 100, account is taken of a bundle N1 of avoidance trajectories around the nominal avoidance trajectory TE. These avoidance trajectories extend horizontally on either side of the nominal avoidance trajectory TE and together with the nominal avoidance trajectory TE they form an envelope that is shown in FIGS. 9 and 10.

During a first time interval, this envelope needs to take account of possible variation in the rate of turn of the aircraft 100. In FIG. 9, the envelope is fan-shaped, the outer limits of the envelope having a radius of curvature $R_e$. This radius of curvature $R_e$ of the envelope may for example be such that:

$$R_e = \frac{V_H^2}{g \cdot \tan(\varphi)}$$

where g is the acceleration due to terrestrial gravity, φ is the roll angle of the aircraft plus or minus uncertainty on this roll angle of the aircraft 100, and $V_H$ is the horizontal component of its forward speed. By way of example, the uncertainty on the roll angle of the aircraft may be taken to be equal to 5°.

The initial width of the fan and its length d1 may be 100 meters (m) over this first time interval traveled at the current forward speed of the aircraft 100. Thereafter, this envelope takes on the shape of a triangle during a second time interval, and then the shape of a rectangle during a third time interval; the complete envelope being shown in FIG. 10.

The triangle constituted by the envelope over the second time interval may for example be an isosceles triangle with an angle at the apex β equal to 30°, and the envelope has a lane width L equal to 1 nautical mile during the third time interval.

Finally, during the second step 2 of this method, a warning is issued when a bundle of avoidance trajectories for the aircraft 100 comes within a distance D of the relief being overflown or of any obstacle that is less than the vertical margin Mv. This warning as triggered by the warning means 54 may be visual, e.g. displaying a message on a screen present in the aircraft 100, and/or it may be audible, e.g. being a voice announcement that can be heard by the pilot.

By way of example, a first warning may be issued when the bundle N2 corresponding to an assumed reaction time T2 of the pilot being equal to 20 s leads to a distance D from the overflown relief that is less than the vertical margin Mv in order to warn the pilot of the risk of collision.

By way of example, a second warning may be issued when the bundle N1 corresponding to an assumed reaction time t1 of the pilot of 5 s leads a distance D from the relief being overflown that is less than the vertical margin Mv in order to warn the pilot of an imminent risk of collision.

Furthermore, in a variant of the invention, the method whereby an aircraft 100 issues a warning to avoid terrain may be coupled to an autopilot 120 of the aircraft 100. Thus, the method of the aircraft 100 issuing a terrain avoidance warning may include an additional step 3 during which the avoidance maneuver may be performed by the autopilot 120.

A control member used in this variant may for example be present on a handle of one of the sticks used for piloting the aircraft 100. When a warning is issued and if the pilot actuates the control member, then the autopilot performs the avoidance maneuver.

The autopilot may also perform the avoidance maneuver automatically, e.g. if a bundle of avoidance trajectories based on a zero reaction time leads to a distance D from the relief being overflown that is less than the vertical margin Mv.

Naturally, the present invention may be subjected to numerous variations as to its implementation. Although several implementations are described, it will readily be understood that it is not conceivable to identify exhaustively all possible implementations. It is naturally possible to envisage replacing of the means described by equivalent means without going beyond the ambit of the present invention.

What is claimed is:

1. A method of issuing a terrain avoidance warning by a rotary wing aircraft, the method comprising the following steps performed repetitively:
    preparing at least one bundle of possible avoidance trajectories for the aircraft in order to avoid said aircraft colliding with relief being overflown by said aircraft or with an obstacle if any; and
    triggering a warning if any one of said bundles of possible avoidance trajectories leads to a distance from said relief being overflown or from said obstacle if any that is less than a predetermined distance:
    wherein said possible avoidance trajectories are determined by a computer on the basis of a predetermined avoidance maneuver and on the basis of current states of said aircraft, said avoidance maneuver comprising:

a deceleration stage of deceleration down to a predetermined forward speed $Va_{final}$, said deceleration stage being obtained by said aircraft taking up a predetermined nose-up attitude and being performed at a predetermined maximum power of said aircraft; and a final stage of said aircraft climbing, during which the forward speed of said aircraft is kept equal to said predetermined forward speed $Va_{final}$ and the power from the engines is kept equal to said predetermined maximum power wherein said aircraft has a maximum continuous power and said predetermined maximum power of said aircraft is said maximum continuous power, and wherein said avoidance maneuver includes an initial stage of restoring said aircraft to straight line flight, which stage is performed before said deceleration stage.

2. A method according to claim 1, wherein said deceleration stage is performed with a cyclic stick of said aircraft so that during said deceleration stage, a portion of the kinetic energy of said aircraft is transformed into potential energy of said aircraft enabling a vertical speed Vv of said aircraft to be increased until said predetermined forward speed $Va_{final}$ is reached.

3. A method according to claim 2, wherein said avoidance maneuver is performed with a collective stick of said aircraft so as to adjust the power developed by said aircraft to a value equal to said predetermined maximum power of said aircraft.

4. A method according to claim 1, wherein said distance between each bundle of possible avoidance trajectories and said relief being overflown or indeed said obstacle if any that is compared with said predetermined distance is along a direction that is vertical only.

5. A method according to claim 1, wherein said possible avoidance trajectories of each bundle constitute an envelope of fan shape over a first distance d1 with a radius of curvature $R_e$ given by the relationship:

$$R_e = \frac{V_H^2}{g \cdot \tan(\varphi)}$$

g being an acceleration due to terrestrial gravity;

φ being a roll angle of the aircraft; and $V_H$ being a horizontal component of the current forward speed of said aircraft.

6. A method according to claim 1, wherein, in order to determine each avoidance trajectory of said aircraft, future states of said aircraft are determined on the basis of states of said aircraft during at least five seconds preceding the current state of flight of said aircraft.

7. A method according to claim 1, wherein a vertical speed Vv of said aircraft is determined by a formula:

$$Vv = Vv_S(V_a, M_a, P_S, T_S, E_S) + GS\frac{\gamma_H}{g}$$

$Vv_S(V_a, M_a, P_S, T_S, E_S)$ corresponding to a static component $Vv_{STAT}$ of said vertical speed Vv, said static component $Vv_{STAT}$ being taken from a table obtained from charts in a flight manual of said aircraft, and $$GS\frac{\gamma_H}{g}$$

corresponding to a dynamic component of said vertical speed Vv, $V_a$ being a forward speed of said aircraft relative to the air;

$M_a$ being an apparent mass of said aircraft such that:

$$M_a = M\frac{\sqrt{g^2 + \gamma_H^2}}{g}$$

M being a mass of said aircraft, g being an acceleration due to terrestrial gravity, and $\gamma_H$ being a horizontal acceleration of said aircraft;

$P_S$ being a static pressure around said aircraft;

$T_S$ being a static temperature around said aircraft;

$E_S$ being a parameter corresponding to a state of one or more engines of said aircraft; and GS being a forward speed of said aircraft relative to the ground.

8. A method according to claim 1, wherein said predetermined nose-up attitude of said aircraft is constant.

9. A method according to claim 8, wherein said predetermined nose-up attitude of said aircraft is 15° relative to a horizontal plane.

10. A method according to claim 1, wherein said predetermined forward speed $Va_{final}$ corresponds to a forward speed Vy producing an optimum speed for climbing.

11. A method according to claim 1, wherein each bundle of said possible avoidance trajectories corresponds to a predetermined assumed reaction time of a pilot for performing each avoidance trajectory of said bundle.

12. A method according to claim 11, wherein a first warning is triggered when said bundle of avoidance trajectories leads to a distance less than said predetermined distance from said relief or said obstacle if any that corresponds to an assumed pilot reaction time equal to 20 s, in order to inform the pilot of a risk of said collision.

13. A method according to claim 11, wherein a second warning is triggered when said bundle of avoidance trajectories leads to a distance that is less than said predetermined distance from said relief or from said obstacle if any that corresponds to an assumed pilot reaction time equal to 5 seconds, in order to warn the pilot of an imminent risk of said collision.

14. A method according to claim 1, wherein said avoidance trajectory does not include a resource stage at constant load factor and constant speed.

15. A method according to claim 1, wherein said aircraft has an autopilot and said avoidance trajectory is followed by said autopilot as soon as a warning is triggered.

16. A device for issuing a terrain warning and for installing on board an aircraft, said device comprising:

at least one computer suitable for performing a trajectory prediction algorithm;

at least a first database of the relief of flying zones of said aircraft connected to said computer; and at least one warning means connected to said computer, wherein said device is suitable for performing the method according to claim 1.

17. A rotary wing aircraft comprising:
at least a main rotor having a plurality of blades;
a cyclic stick controlling a cyclic pitch of said blades of said main rotor;
a collective stick controlling a collective pitch of said blades of said main rotor; and
a plurality of sensors providing information about atmospheric parameters concerning operation of said aircraft and about states of said aircraft;
wherein said aircraft includes a device according to claim 16.

* * * * *